US008892883B2

(12) United States Patent
Yerli

(10) Patent No.: US 8,892,883 B2
(45) Date of Patent: Nov. 18, 2014

(54) RENDER SERVICE FOR REMOTE ACCESS TO APPLICATIONS

(75) Inventor: Cevat Yerli, Frankfurt am Main (DE)

(73) Assignee: Crytek IP Holding LLC, Wilmington, DE (US)

( * ) Notice: Subject to any disclaimer, the term of this patent is extended or adjusted under 35 U.S.C. 154(b) by 0 days.

(21) Appl. No.: 13/462,667

(22) Filed: May 2, 2012

(65) Prior Publication Data

US 2012/0284513 A1 Nov. 8, 2012

Related U.S. Application Data

(60) Provisional application No. 61/481,669, filed on May 2, 2011.

(51) Int. Cl.
*H04L 9/32* (2006.01)
*G06F 7/04* (2006.01)
*G06F 17/30* (2006.01)
*H04K 1/06* (2006.01)
*G06F 15/16* (2006.01)
*G06F 15/173* (2006.01)
*H04L 29/08* (2006.01)
*G06F 21/53* (2013.01)
*H04L 29/06* (2006.01)
*G06F 9/44* (2006.01)

(52) U.S. Cl.
CPC ............... *H04L 67/08* (2013.01); *G06F 21/53* (2013.01); *H04L 67/38* (2013.01); *H04L 69/14* (2013.01); *G06F 9/4445* (2013.01); *H04L 63/0428* (2013.01)
USPC ................... 713/168; 726/3; 726/27; 380/37; 709/219; 709/225; 709/231

(58) Field of Classification Search
USPC ........... 713/168; 726/3, 27; 380/37; 709/219, 709/225, 231
See application file for complete search history.

(56) References Cited

U.S. PATENT DOCUMENTS 8,391,494 B1 * 3/2013 Serenyi .......................... 380/278
2001/0037465 A1 * 11/2001 Hart et al. ..................... 713/201
(Continued)

FOREIGN PATENT DOCUMENTS

CN          101771681 A    7/2010
DE  10 2006 038 155 A1    3/2007
(Continued)

OTHER PUBLICATIONS

European Search Report mailed Sep. 17, 2012, issued in European Patent Application No. 12 16 6337 filed May 2, 2012, 5 pages.

(Continued)

*Primary Examiner* — Aravind Moorthy
(74) *Attorney, Agent, or Firm* — Christensen O'Connor Johnson Kindness PLLC

(57) ABSTRACT

The present disclosure relates to providing remote access to applications with an increased level of security. A server for providing access to applications is provided, as well as a method therefor, comprising an input channel and an output channel to connect a client with said server, an interface coupled to said input channel and an application, said interface to receive input data from said client via said input channel and to communicate said received input data to the application, and a renderer coupled to said output channel and said application, said renderer to render the output of said application into a data stream to be transferred via the output channel to the client, wherein the input data and the data stream are both encrypted.

18 Claims, 5 Drawing Sheets

(56) References Cited

U.S. PATENT DOCUMENTS

| | | |
|---|---|---|
| 2004/0080533 A1 | 4/2004 | Nishtala |
| 2004/0239681 A1 | 12/2004 | Robotham |
| 2005/0134611 A1 | 6/2005 | Cheung |
| 2006/0184614 A1 | 8/2006 | Baratto |
| 2007/0046966 A1 | 3/2007 | Mussack |
| 2007/0263007 A1 | 11/2007 | Robotham |
| 2009/0210487 A1 | 8/2009 | Westerhoff |
| 2010/0063992 A1 | 3/2010 | Ma |
| 2010/0115022 A1 | 5/2010 | Rapo |
| 2010/0268828 A1 | 10/2010 | Pahlavan |
| 2011/0225423 A1* | 9/2011 | Lynch ............................ 713/171 |
| 2011/0317831 A1* | 12/2011 | Passera et al. ................. 380/201 |
| 2012/0005746 A1* | 1/2012 | Wei et al. ......................... 726/15 |
| 2012/0131341 A1* | 5/2012 | Mane et al. .................... 713/168 |
| 2012/0164975 A1* | 6/2012 | Dodeja et al. .................. 455/410 |
| 2012/0174191 A1* | 7/2012 | Wood ................................ 726/4 |

FOREIGN PATENT DOCUMENTS

| | | |
|---|---|---|
| EP | 1 521 467 A2 | 4/2005 |
| EP | 2 184 092 A2 | 9/2009 |
| JP | 2000-285150 A | 10/2000 |
| JP | 2003-346183 A | 12/2003 |
| JP | 2008-145985 A | 6/2008 |
| WO | 2007/032912 A1 | 3/2007 |
| WO | 2008/040123 A1 | 4/2008 |
| WO | 2009/073792 A1 | 6/2009 |
| WO | 2009/076178 A1 | 6/2009 |
| WO | 2010/102875 A1 | 9/2010 |

OTHER PUBLICATIONS

Office Action dated Jul. 21, 2014, in Chinese Patent Application No. 201210134345.7, filed May 2, 2014, 7 pages.

* cited by examiner

RENDER SERVICE FOR REMOTE ACCESS TO APPLICATIONS

CROSS-REFERENCE TO RELATED APPLICATION

This application claims the benefit of U.S. Application No. 61/481,669, filed May 2, 2011, the disclosure of which is incorporated by reference herein in its entirety.

FIELD

The present disclosure relates to providing remote access to applications with an increased level of security. In particular, the present disclosure refers to a server hosting applications, which can be accessed by a client through secured communication channels. The output of the accessed application is rendered on the server and provided to the client via an encrypted data stream.

BACKGROUND

Modern applications require a high level of security. In particular, many online services require a secure method which enables a secured access to sensitive data. However, current applications often fail to deliver a desired level of security. One of the reasons is that operations processed on use's device(s) are prone to be manipulated in various ways since the user-processed operations cannot be fully protected, e.g., by a (trusted) central system.

As an example, a typical application executed on a client may connect to a server to retrieve security-critical data. The application may perform an authentication of the user and may transfer the security-critical data from the server to the client. If the application on the client is manipulated or hacked, an intruder may gain access to the authentication data and may observe or manipulate the security-critical data transferred to the client. Also, the data entered by the user and the data communicated between the server and the client may be observed, for example, by employing exploits or key loggers, and by sniffing of data packets or phishing of authentication data or other undesirable data observation, manipulation, or corruption, which allows to re-use the observed data later on in an undesirable manner.

One of the reasons that facilitates such attacks is that a user may execute applications on a possibly untrusted system. The system may be corrupted, for example, by various kinds of malicious code, such as spyware, viruses, trojans or malware, security exploits, or other code that allows access to and manipulations of the data communicated between the application and the accessed online service.

Another security issue relates to unauthorized execution of applications, wherein data communicated to such applications from a server may be used in an unauthorized way. This is due to the fact that applications and data installed on a client device are possibly prone to malicious manipulations and unauthorized access. The related code may be modified such that a server of the application provider would not be capable to correctly authenticate the integrity of the application, possibly leading to transfer of security-critical data to the unauthorized application.

Common approaches to handle such security issues include employment of encryption methods and, for example, checking of integrity of applications and systems, e.g., by certificates or other cryptographic signatures and methods. Yet, it remains one of the core problems of computer security technology that each piece of code executed on an unsecured client or system could easily be attacked or manipulated and, therefore, creates a security threat.

Therefore, it is an object of the present disclosure to improve the security level and integrity of applications.

SUMMARY AND INITIAL DESCRIPTION

A server for providing access to applications according to the present disclosure, in at least one embodiment, comprises an input channel and an output channel to connect a client with said server, an interface coupled to said input channel and an application, said interface to receive input data from said client via said input channel and to communicate said received input data to the application, and a renderer coupled to said output channel and said application, said renderer to render output of said application into a data stream transferred via the output channel to the client, wherein the input data and the data stream are both encrypted.

The server provides a communication interface between the client and the application, such as a security-critical application or an online service. The communication is established via two independent channels, the input channel and the output channel, and is mediated by the interface and the renderer of the server, respectively. Both channels can be established within one network connection. However, in some embodiments both channels are completely separate channels established independently from each other. Thus, if one of the channels is observed, the intruder will not automatically gain access to the communication data of the other channel.

The input channel transports input data from the client back to the server in an encrypted way. The input channel is coupled to the interface of the server, which is configured to deliver said received input data to the application. The encrypted input data may be either decrypted in the interface of the server and delivered to the application via a secured connection or the interface may be configured to directly pass the encrypted input data to the application without decrypting said input data, in which case the application takes care of decrypting the input.

The application receives the input data to control the execution or to update the current operating state. In response, the application generates an output and provides said output data to the renderer of the server. The renderer is configured to receive and process various kinds of output data of applications on various levels, including low-level update commands, e.g., calls to interfaces of output libraries, such as graphics or audio libraries, or an already rendered output of the application. In some embodiments, the output data is transferred to the renderer via a secured connection.

The renderer is configured to receive and to process the output data and to generate the data stream, which is transferred to the client via the output channel. In some embodiments, the data stream is encrypted such that it may only be deciphered by the receiving client. In addition or as an alternative, the output channel may as well be encrypted, thus reducing the risk of interception.

Since the rendering is done on the server independently of specifications of the connected client devices, the quality of the rendered output of the application can be very high and may, for example, comprise a rich representation of highly detailed three-dimensional graphical objects and of sound effects and music. Therefore, the client is not concerned with any rendering tasks and needs no additional rendering resources. The client only has to be capable of adequately representing the output data stream received from the server. Hence, the approach described herein allows the highest quality of output on any client device, which is only limited by the rendering capabilities and resources of the server.

The server provides an access to applications, in some embodiments security-critical applications or online services, with an increased level of security, since the access is completely controlled by the server via the interface coupled to the input channel for receiving input and the renderer coupled to the output channel for transmitting the output data stream. Thus, the client is not directly connected to the application hosted by the server and, in particular, has no direct or indirect access to any data utilized by the application on the server. The client must only be capable of connecting to the server, decrypting and displaying the received data streams as well as encrypting and sending input data to the server. Therefore, the client must only comply with the communication interface of the server and needs not to have any particular knowledge of any communication and access details of the application hosted on the server. The client may even be completely unaware of the type and specification of the accessed application and of any additional functionality of the application.

Therefore, any security-related manipulation done on the client's side has either no effect, since there are no direct security-critical weak points, such as specialized interfaces or downloaded security data, or manipulations are detected at the server, which may in this case block access to the hosted application. In fact, the user on the client device only interacts with an output data stream. Any interaction of the user, such as clicking buttons on the screen or entering keys, does not invoke any direct functional processing within the client but are rather transferred to the server as input data, where they are processed and delivered to the respective application hosted by the server. Also, the server itself may in some embodiments only have the data necessary for the respective actions of the client. In particular, the application and any related data in some embodiments remains separated from the client through the interface and renderer of the server.

Furthermore, the system cannot be attacked or hijacked by intercepting the communication between client and server, since both communication channels are encrypted and in some embodiments run completely independent from each other. Therefore, access to the particular application hosted by the server is only possible on the client where both channels converge, i.e., where the data stream transferred via the output channel is received and the input data transferred via the input channel are generated. In particular, interception of the output channel, which would require hijacking of the communication channel and deciphering of the output data stream, would at most allow to observe or manipulate the application output but only without a possibility of interacting with the application. Also, interception (and decryption) of the input channel would only allow to observe the input or (blindly) include additional data, since there is no possibility of observing the application's results. Consequently, only at the client device the user may fully interact with the application.

The server allows to run applications online instead of downloading the application or a part of the application, which further to an increase of security greatly simplifies installation and maintenance of applications on the client device. Users of an application may access the application from any device, which is capable of connecting and communicating with the server and which fulfils the minimum requirements of the renderer in order to display the data stream. Furthermore, users of the application can be sure to always have access to the same and most up-to-date application, no matter from what kind of client device they access the application, since the application is not installed but rather just started (online) and used via the server.

In an embodiment of the present disclosure, said application is executed in an environment. In some embodiments, said interface and said renderer of the server are coupled to the environment via a secured connection, which guarantees a high level of security and integrity of the communicated data, e.g., by encryption and verification of the transported data. The environment can be hosted on a dedicated system comprising its own hardware and operating system or may be instantiated as a virtual environment, such as a virtual machine, co-located with other environments on the server. The environment may also be a more restrictive environment representing a secured environment or a safe zone, such as a sandbox with limited interaction capabilities. The environment can be configured to only allow access to the application via the secured connection to the interface and renderer of the server such that any other communication request is blocked by the environment. Thus, each application is in some embodiments hosted in its own environment and completely isolated from other applications or any uncontrolled access.

The server in some embodiments enables third-party application providers to upload applications and execute these applications in a secured environment. While the application can be managed by the respective third-party application provider, the server and its components and services, such as interface, renderer, encryption, and decryption of the communication data, as well as the server infrastructure can be provided and managed by the owner or provider of the sever, who may differ from the third-party application provider. The server may provide a service for third-party application providers to run their applications in a safe zone and may allow users of these applications to use them in a secure way, which guarantees that no manipulations by intruders can harm any sensitive data or functionality of the application.

In some embodiments, said environment is located on the server. The operating system of the server in some embodiments has the capability of instantiating environments for the execution of applications, such as secured environments or virtual machines, which may be restricted to only interact with the interface and the renderer of the server, in some embodiments via a secured connection. The connection may be established by means of system and communication functions of the operating system or may use instances of a communication class, which is in some embodiments designed and configured to protect data from unauthorized access during transport between system components. For example, the data to be transported may be temporarily stored or cached in a shared memory, cache, or storage, while a pointer to the transported data is passed to the receiving component. In some embodiments, the transported data is encrypted and stored in a storage object in the shared memory or cache and only decrypted if the storage object containing the data is being requested by the authorized receiving component. Thus, even though the environment executing the application is being co-located on the same server, which also grants access to said application, the server is configured to encapsulate and separate the server components connected to the client and said environment executing the application and to protect the communicated data in order to minimize possible security threats.

In an embodiment of the present disclosure, the server further comprises a management component for setting-up the environment and managing the application in said environment. In some embodiments, the management component allows third-party application providers to upload an application to an assigned environment on the server. In particular, the application will not be installed on any other system outside of the server it was uploaded to. Therefore, the application has to be tested on one system only and will always run and behave in the same way irrespective of client hardware or an operating system on the client device. Since the application interacts with the client only via the interface and the renderer of the server, no further adaptations to other hardware or systems are required. The management component further enables third-party application providers to update their applications, such as by uploading and installing fixes, upgrades, updates, or changes of the installed application. The management component may comprise pipelines, which are provided by the server provider but are under full control of the third-party application provider in order to ensure a maximum of security for the application and related data. Also, the third-party application provider has full control of the application management and is not dependent on support from the server provider. In order to protect the management component from undesired access, the management component in some embodiments fulfills high security standards for online access and may even require a local or direct connection of the third-party application provider with the server in order to install and manage the application. In addition, the management component may only have access to the corresponding application. Other components of the server or other applications hosted by the server are in some embodiments not accessible by the management component.

In another embodiment of the present disclosure, said environment further comprises a database coupled to said application. The database may store data in a memory or any other data storage, which is in some embodiments integrally linked to the environment, such as the memory space or a data storage of the environment or a separate data storage, which is accessible within the environment. The database may store security-critical or sensitive data that are in some embodiments separated from the application itself in order to further protect the data from unauthorized access. Thus, the application can be uploaded to the respective environment without its corresponding data. Also, the server itself in some embodiments only has access to data necessary for a current action and for the access to the application within the environment, while the source of the data or any sensitive data remains in the database. The database may be accessed by the application via an internal connection, in some embodiments a secured connection within the environment executing the application. The internal connection may be similar to the secured connection between the interface and renderer of the server and the environment. However, since the internal connection is provided within the environment, the data stored in the database in some embodiments never leave the environment and, therefore, cannot be intercepted from outside of the environment, for example, by components or the operating system of the server. Particularly, the internal connection between the application and the database is not visible to any client accessing the application. Any request from the client related to sensitive data is handled by the server, which communicates the request to the application that, in turn, queries the database for the requested data. However, the client and also the server are not granted direct access to the database. Rather, any access to the database is handled by the application itself and only the output of the application is provided to the renderer of the server for final rendering and transmission of the output to the client. In some embodiments, each application is connected to its own database or a plurality of databases within the environment, which, in turn, may be directly coupled to this specific application only. The database infrastructure may be provided by the server provider, the third-party application provider, or a third-party data provider. In some embodiments, the database and the data stored within can be controlled and managed by the third-party application provider or the third-party data provider. Thus, the data in some embodiments stays under full control of one or both of the third-party providers and can only be accessed through the application for maximum safety.

In yet another embodiment of the present disclosure, the interface and the renderer are coupled to one or more additional applications executed in one or more additional environments. In some embodiments, each one of said one or more additional environments is configured in the same way as the environment and may comprise similar or same components and security features as the environment, such as connections, databases, and encryption and decryption of transported data. In particular, each one of said one or more additional environments can be located on the server or on a separate system or resource. Likewise, each one of said one or more additional environments may be implemented as separate hardware with an individual operating system or as a virtual environment within an operating system, such as a virtual machine or a sandbox. The server and its components, including the interface and the renderer, are in some embodiments coupled to each one of said one or more additional environments via a connection, such as a secured connection, in order to deliver the input data received by a client accessing an application to the associated environment and to provide the output of the respective application to the renderer for transfer to said client. The server may allow a plurality of third-party application providers to upload their applications via the server to corresponding environments, such that all applications have their own space in the corresponding environments and are sealed off from each other. In some embodiments, each third-party application provider manages his application or a plurality of his applications in the associated environments within the given constraints. In particular, no other third-party application provider may be allowed to access any application of other third-party application providers.

According to an embodiment of the present disclosure, the data stream includes an audio stream and a video stream, wherein the audio stream is compressed using an audio codec, the video stream is compressed using a video codec, and the encoded audio and video streams are assembled in a container bitstream. In some embodiments, the data stream is a multimodal data stream or a multimedia data stream. The multimedia data stream may include the video stream and/or the audio stream, generated by the renderer from the output of the accessed application. For example, the renderer may transform a visual output of the application into a video stream. Similarly, the renderer may transform any additional or alternative output of the application, such as an audio output or output data of other modalities into a corresponding data stream. In some embodiments, the renderer is not restricted to two-dimensional visual output data and may, for example, be capable of receiving a stereoscopic output of the application and related commands and producing two video streams or one interlaced video stream, transporting visual data for the respective eye. Similarly, the renderer may also be capable of generating an audio stream carrying spatial sound data as well as data streams for other multi-dimensional multi-modal data. The audio codec can be any encoding technique capable of receiving audio output and generating an audio data stream, such as WMA, AAC, or Vorbis. In some embodiments, the audio codec may support encryption of the audio stream. Similarly, the video codec may be any encoding technique capable of receiving video output and generating a video data stream, such as WMV or MPEG-4. In some embodiments, also the video codec may support encryption of the video stream. Other codecs for generating audio or video streams or any streams for other modalities preferably supporting encryption of the related input data stream or allowing for subsequent encryption of the resulting audio or video stream or any stream for another modality may be used as well. The container bitstream may be any suitable bitstream configured to accommodate one or more data streams, such as ASF or ISMA. However, other suitable container bitstreams may be used as well, preferably allowing for a subsequent encryption of the resulting container bitstream.

In an embodiment of the present disclosure, the input data comprises one or more of a key stroke, mouse data, touch data, photographic information, finger scan, credit card scan, and ID-scan. In particular, the input data may comprise any data usually entered in order to control an application, preferably except for executable commands or functions.

In an embodiment of the present disclosure, the interface is further configured to authenticate said client, including receiving authentication data from the client via an encrypted transfer and verifying the authentication data with said application. In some embodiments, a user may activate a service by connecting a client to the server and requesting access to an application. The server may start streaming of an encrypted video stream requesting authentication of the user on the client. The user may enter his authentication and send the corresponding authentication data to the server via an encrypted transfer. In some embodiments, the authentication data are passed to and verified by the requested application. Only if the application accepts the authentication of the user, the server can establish the data stream to the client, transporting the output of the requested application. The server may use one of the input channel and the output channel, or both in order to authenticate the user. For example, the server may stream the encrypted request for authentication and receive the authentication data through the input channel only before establishing the output channel for streaming of the application's output to the client. The server may also establish both channels first and use the output channel to stream the authentication request and the input channel to receive the authentication data. In some embodiments, the authentication is performed according to any suitable authentication protocol, comprising exchange of certificates, keys, and other parameters, as well as encrypted passwords, IDs or finger scans, and others, such as CHAP, PAP, EAP, or Kerberos protocol.

In an embodiment of the present disclosure, the data stream is encrypted based on the authentication of the client using a public-key algorithm or a symmetric-key algorithm. In some embodiments, the data stream and/or the output channel may be encrypted using a symmetric-key approach, preferably a block cipher or a stream cipher, such as AES (Rijndael), DES, Triple DES, Serpent, RC4, and others. Also, an asymmetric encryption technique may be used in order to encrypt the data stream and/or the output channel, such as Diffie-Hellman, elliptic curve algorithms, RSA, and others. In some embodiments an encryption technique is chosen, which allows to quickly decipher the data stream without excessive use of resources on the client device, however, without compromising the chosen security level for the access to the application. For example, a block or stream cipher may be chosen and frequently changed during streaming in order to complicate any unauthorized decryption of the data stream, while enabling a fast decoding of the data stream.

In yet another embodiment of the present disclosure, the input data is encrypted using a public-key algorithm or a symmetric-key algorithm. In some embodiments, an asymmetric encryption technique is used in order to encrypt the input data and/or the input channel, such as Diffie-Hellman, elliptic curve algorithms, RSA, and others. However, the input data and/or the input channel may also be encrypted using a symmetric-key approach, such as AES (Rijndael), DES, Triple DES, Serpent, and others. The encryption of the input data may also be based on the results of the authentication of said client. The encryption of the input data and/or the input channel does not necessarily impose restrictions with regard to decryption resources of the client, since the decryption is performed on the server and thus not limited in this regard. In some embodiments, an encryption technique is chosen, which allows for a fast encryption with limited resources on the client device. However, it is to be understood that a suitable encryption technique has to be chosen, which guarantees the desired level of security.

In some embodiments, also additional encrypted data may be transferred to the client via the output channel. Such additional data may comprise control data for the application running at the client, authentication data, or other security-related data. The additional data may be encrypted by the application, passed to the renderer of the server and directly transferred to the client via the output channel. The renderer may also receive raw unencrypted additional data from the application, encrypt the data, and transfer the data together with the data stream to the client. For example, the application may transport non-video data to the renderer, which are transferred to the client as needed in addition to a video-stream of the output of the application.

In an embodiment of the present disclosure, the client connects to the server through a small-client application or an application embedded in a web page. The client device may be a conventional personal computer, a laptop, a portable device, a smart phone, a web-enabled TV, or any other communication device, capable of connecting with the server. In particular, no specialized resources, such as high-end graphic cards or rendering components, or an increased processing power are required on the client device in order to access said application through the server. The client device is only required to establish the input channel and the output channel to the server, to send input data to the server and to display the data stream rendered at the server, respectively. In some embodiments, the client device executes said small-client application, which may be pre-installed on the device or which may be downloaded from the server. The client device may also connect to the server by executing a web browser and displaying a web page or document comprising code to access said server. Thus, the client application needs not to be installed on the client device. Since all calculations and rendering are done on the server, the approach ensures the same high output quality and identical computational results irrespective of the kind of client device connected to the server.

In some embodiments, the input channel and the output channel are established within Internet or a broadband network. The broadband network may be any network capable of transporting data streams and information at a suitable data speed, which may be sufficiently high to deliver the output to the client as well as the input to the server with a low latency, preferably of less than 200 ms, most preferably of about or less than 100 ms, and with particular preference of less than 35 ms. Since the input and the output channels are in some embodiments separated from each other, also a combination of networks could be used, such as a combination of a satellite network and Internet, wherein the input channel is being established through the Internet and the data stream is transferred to the client via the output channel through the satellite network. The broadband network may also be any of a cable television network, a powerline network, an ATM network, or a mobile network, such as 3GPP Long Term Evolution (LTE), or a network complying with the 4G or 5G network standards. In some embodiments, the input and output channels may be established via the Internet using TCP/IP independently of the client device used.

Furthermore, a system according to the present disclosure comprises a server according to an embodiment of the present disclosure, one or more clients, and a communication network to accommodate one or more of said input and output channels, wherein each of said one or more of said input and output channels is configured to connect one of said one or more clients with said server.

A method for providing access to applications according to the present disclosure comprises connecting a client with a sever via an input channel and an output channel, receiving input data from said client via said input channel, communicating said received input data to an application, rendering output of said application into a data stream, and transferring said data stream via the output channel to the client, wherein the input data and the data stream are both encrypted. In some embodiments, said input data is received by an interface of the server and said application output is rendered by a renderer of the server. In some embodiments, said interface and renderer of the server are coupled to said application via a connection, such as a secured connection.

The method greatly improves the level of security for access to applications, such as security-critical applications or online services, since applications are accessed through the server only and need not to be downloaded, installed, or executed on the client itself. All relevant input and output data is transferred between server and client in two separate secured communication channels, which only comprise already rendered output data and input data, respectively, that cannot be meaningfully decoded independent of each other. Moreover, the application may be completely shielded from any unauthorized access. Consequently, any manipulation, modification, hijacking, or other attacks on the application or the communication channels are extremely difficult, unfeasible, or even impossible.

In an embodiment of the present disclosure, the method further comprises executing said application in an environment. In some embodiments, the method further comprises providing said environment on the server.

In an embodiment of the present disclosure, the method further comprises setting-up the environment and managing the application in said environment through a management component of the server. Thus, the environment may be assigned to a third-party application provider, which may set-up the environment and manage the application. In some embodiments, the third-party application provider may install, test, update, or fix the application within the environment. All other functionality and services are provided by the server and, in some embodiments, cannot be modified by the third-party application provider.

In yet another embodiment of the present disclosure, the method further comprises said application accessing a database in said environment. In some embodiments, said database is accessed via an internal secured connection within said environment.

In yet another embodiment of the present disclosure, the method further comprises providing one or more additional applications executing in one or more additional environments. In some embodiments, said interface and renderer of said server are coupled to said one or more additional environments in order to provide access to each of the hosted applications.

According to another embodiment of the present disclosure, the method further comprises transferring additional encrypted data to the client via the output channel. Said transferring of additional encrypted data may comprise inserting the additional data and the data stream into a container stream and encrypting the container stream and/or interlacing the encrypted data stream with said encrypted additional data.

According to an embodiment of the present disclosure, said rendering comprises rendering an audio stream and a video stream into said data stream, encoding the audio stream using an audio codec, encoding the video stream using a video codec, and assembling the encoded audio and video streams in a container bitstream. Furthermore, the data stream may be any multi-modal data stream or multimedia data stream.

In yet another embodiment of the present disclosure, said method further comprises authenticating said client, including receiving authentication data from the client via an encrypted transfer and verifying the authentication data with said application. The input channel or the output channel or both channels may be used to request authentication of the client as well as to transfer said authentication data to the server. Also, further communication channels may be established and used in order to securely authenticate said client.

In an embodiment of the present disclosure, the method further comprises encrypting the data stream based on the authentication of the client using a public-key algorithm or a symmetric-key algorithm, and encrypting the input data using a public-key algorithm or a symmetric-key algorithm. In some embodiments, said encrypting the input data may also be based on a result of the authentication of the client.

According to an embodiment of the present disclosure, the client connects to the server through a small-client application or an application embedded in a web page. In particular, the method may further comprise establishing the input channel and the output channel within Internet or a broadband network.

Furthermore, a computer program product according to the present disclosure comprises one or more computer-readable media having program code means stored thereon, wherein said program code means when installed and executed on a server, cause the server to perform a method according to an embodiment of the present disclosure.

DESCRIPTION OF THE DRAWINGS

Further details and characteristics of the disclosure are described below in exemplifying embodiments of the disclosure in conjunction with the drawings in which.

DETAILED DESCRIPTION

Figure 1:
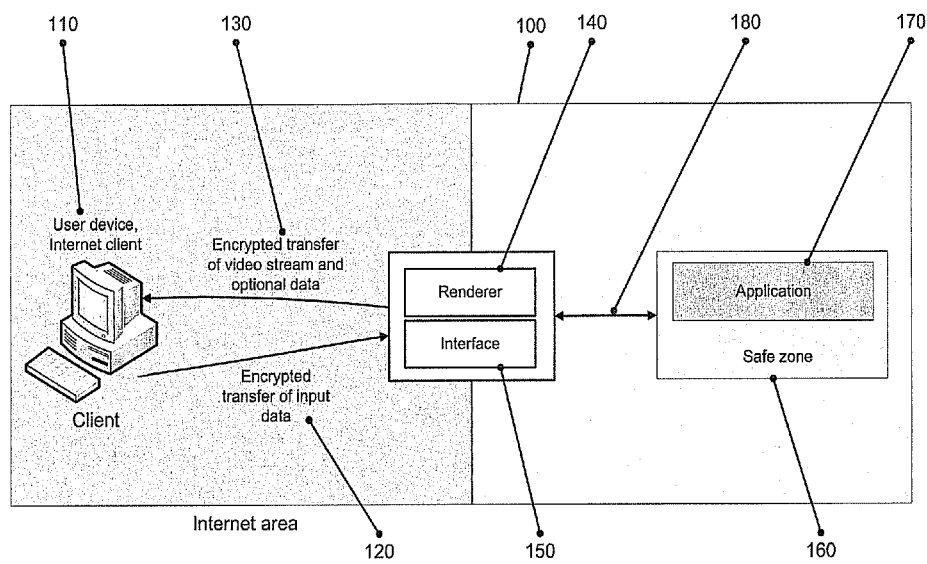
FIG. 1 shows a schematic illustration of a client connected to a server according to an embodiment of the present disclosure, in order to access an application hosted on the server.

FIG. 1 shows a server 100 for providing access to applications according to an embodiment of the present disclosure, wherein the server 100 is connected with a client 110 through an input channel 120 and an output channel 130. The server 100 may be a dedicated server, a cloud server or any suitable server capable of providing online services. The server 100 may comprise a renderer 140 and an interface 150, which are in some embodiments exposed or provided as services by the server 100. The server 100 may also be connected to an environment 160, e.g., a safe zone, a virtual machine, or a sandbox, which encapsulates an application 170, such as an online application, a web service, a cloud application, a gaming application, a security-critical application, or any application requiring an increased level of security and data integrity. The renderer 140 and the interface 150 are in some embodiments coupled to the environment 160 via a connection 180, preferably a secured or encrypted connection. While the client 110, the server 100 and its services 140, 150 may be located in a public area or network accessible, e.g., through the Internet, application 170 may only be accessed through the server 100 and in some embodiments is not exposed to any public space. The server 100 enables third-party application providers to upload their application onto the secured server 100 and keep all critical data inside the environment 160.

In some embodiments, the output or presentation of the application 170, for example, visual or acoustic output, is rendered in the highest possible quality by the renderer 140. The renderer 140, which is provided and maintained by a system or server provider, may be a cloud renderer or any render service delivering rendered data of high quality. In particular, the renderer 140 is not limited to any kind of renderer or to a renderer for a certain modality, such as a visual renderer only. The renderer 140 may be capable of rendering output data for different modalities and for multiple dimensions, such as stereoscopic data or three-dimensional acoustics. The renderer 140 may continuously render the output of the application 170 and feed the results into a data stream, which is transported to the client 110 via the output channel 130. Therefore, no data or information of the application as such leave the server 100, except for the rendered data stream, which, for example, may comprise a video stream or an audio stream. Thus, all potentially sensitive data or information remain inside the application 170 or the environment 160 and no actual data of the application 170 as such is transferred to the client 110.

The client 110 may be any suitable computing device, such as a conventional personal computer, a laptop or mobile computer, a handheld device, or any device capable of establishing connections to a server, such as a tablet computer, a personal digital assistant, a mobile phone, a smart phone, an interactive television device, a video game console, or a simple terminal, which only provides access to the Internet or other networks. In order to access the application 170 on the server 100 the client 110 may execute a small-client application or display a web page comprising a communication interface to access the server 100. In some embodiments, all input on the client 110 related to interaction with the application 170 is encrypted and transferred via the input channel 120 to the interface 150 of the server 100 and further communicated to the application 170 in the environment 160 through connection 180. Likewise, the output of the application 170 can be transferred to the renderer 140 via the connection 180 and rendered into a data stream, which can be encrypted and transferred to the client 110 via the output channel 130. The client 110 may decrypt the received data stream, display the rendered data, and again send any input to the server 100 through the input channel 120.

Figure 2:
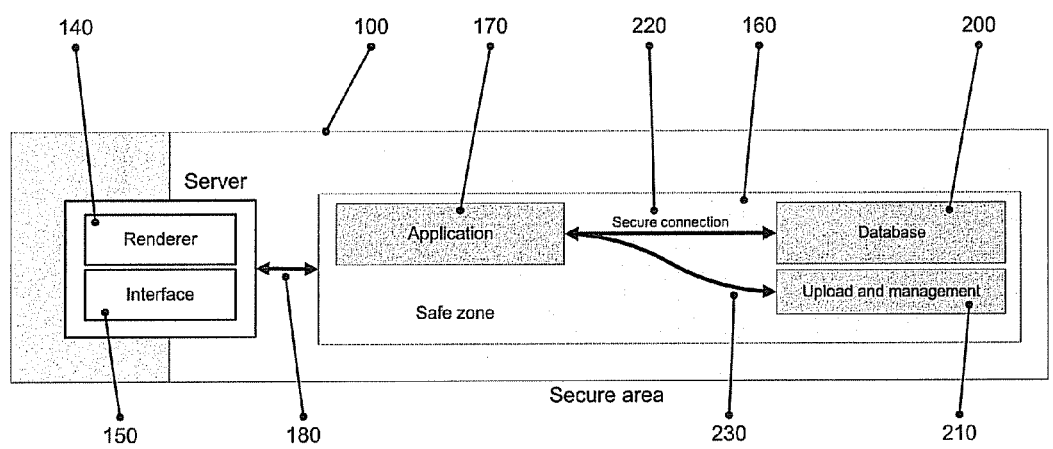
FIG. 2 illustrates an infrastructure of a server according to an embodiment of the present disclosure, comprising communication between interface and renderer of the server and an environment hosting an application and an associated database.

FIG. 2 illustrates an infrastructure of the server 100 according to another embodiment of the present disclosure, comprising communication between the renderer 140 and the interface 150 of the server 100 with the environment 160 hosting said application 170 and an associated database 200. In this embodiment, data of the application 170 can be separated from the application 170 and stored in the database 200. Both, application 170 and database 200 can be maintained through a management component 210. In some embodiments, the management component 210 enables a third-party application provider to upload and manage the application 170. Also, the management component 210 may allow the third-party application provider and/or a third-party data provider to manage the database 200 and to upload data to the database 200.

Application 170 may access the database 200 through an internal connection 220, which may be a secured or encrypted connection, in order to further improve security and data consistency. Furthermore, management component 210 may use a link 230 in order to enable the third-party application provider to upload, install, and maintain the application 170. A similar additional link or said link 230 may also be used to maintain the database 200 and to upload data into the database 200.

In the embodiment of FIG. 2, the application 170 and corresponding data stored in the database 200 are in some embodiments separated. The data remains inside the environment 160 and is only accessed by the application 170 when needed. In particular, the data may be secured by individual safety standards of the third-party application and/or data provider. In some embodiments, the internal connection 220 between application 170 and database 200 is set-up with a higher level of security, for example, as an encrypted or otherwise secured connection, in order to ensure that even a successful attack on the environment 160 would not automatically lead to a full access to data of the database 200. The internal connection 220 can be set-up in a similar way as connection 180. However, since the internal connection 220 is in some embodiments completely established within the environment 160 and therefore cannot be accessed from the outside, the security level of internal connection 220 may be lower in relation to connection 180.

The database 200 may be any suitable database, which allows for secured access to and secured transfer of the data. In some embodiments, the database 200 is managed through the management component 210. Alternatively or in addition, a further database management component may be used to set-up the database 200 and maintain the data. In an exemplifying embodiment, the database infrastructure can be provided by the system or server provider and/or by the third-party application provider, and the data can be uploaded and maintained by the third-party data provider. Alternatively, also the database 200 can be provided and managed by the third-party data provider. Similarly, the data of said database 200 may as well be provided and managed by the third-party application provider.

In some embodiments, the approach described herein enables a storage of data in the separate database 200. However, each application 170 may also comprise the relevant data within the application 170 or another storage, such as one or more files, directly located at the application 170 and the approach is not limited to using a separate database only.

Figure 3:
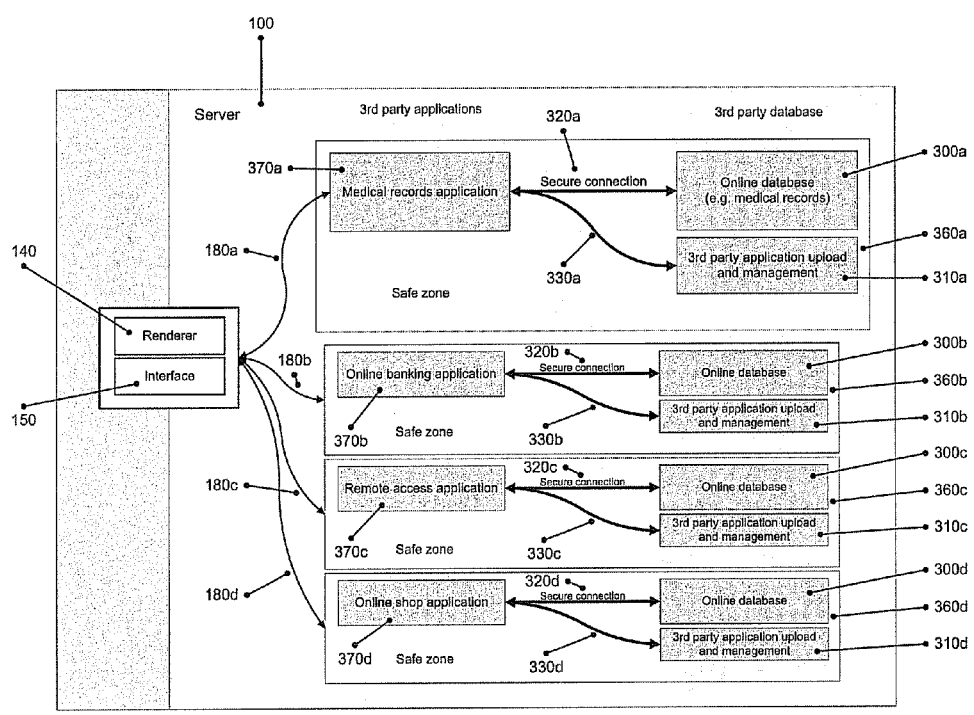
FIG. 3 shows a configuration of a server according to an embodiment of the present disclosure, including a plurality of environments each hosting a separate application and database.

FIG. 3 shows a configuration of the server 100 according to an embodiment of the present disclosure including a plurality of environments 360a, 360b, 360c, 360d each hosting an application 370a, 370b, 370c, 370d and database 300a, 300b, 300c, 300d. Each environment 360a, 360b, 360c, 360d may be coupled to the renderer 140 and interface 150 of the server 100 through a connection 180a, 180b, 180c, 180d. In some embodiments, each environment 360a, 360b, 360c, 360d executes a single, separate application 370a, 370b, 370c, 370d, for example, a medical administration application 370a, online banking 370b, a remote access application 370c, or an online shop 370d. However, it is to be understood that these applications are only examples of applications requiring an increased level of security and the present disclosure is not limited by these particular exemplifying applications. In some embodiments, in each environment 360a, 360b, 360c, 360d, the corresponding application 370a, 370b, 370c, 370d is connected to the associated database 300a, 300b, 300c, 300d via an internal connection 320a, 320b, 320c, 320d. Each application 370a, 370b, 370c, 370d may also be managed by a management component 310a, 310b, 310c, 310d, which may as well be used to manage the respective database 300a, 300b, 300c, 300d. Each application 370a, 370b, 370c, 370d and database 300a, 300b, 300c, 300d can be owned and controlled by the same or another third-party application provider and/or the same or another third-party data provider, respectively.

For example, a health insurance company can use environment 360a to provide their patients' health records to authorized users, such as medical practitioners or other authorized personnel. Since health records are highly confidential and sensitive data, they are in some embodiments stored in database 300a, which is separated from said medical administration application 370a. The authorized user can utilize a client to access the application 370a through the server 100 and request medical records of a patient stored in database 300a. Irrespective of the rendering capabilities and performance of the client device, the renderer 140 of the server 100 renders any document of the requested medical record, such as high-resolution images of an X-ray or a CT, MRI, or fMRI volumetric dataset, at the highest possible resolution and quality, thus allowing the authorized user to examine the image interactively, e.g., with an extreme zoom-in functionality or fast rotation of the rendered volume, which would normally require advanced computational power and resources on the client device of the authorized user. The medical records are stored in the database 300a, which may be either hosted directly on the server 100 or stored on secured servers owned and managed by a third-party data provider, e.g., the health insurance company or another provider of health records.

The approach described herein may as well, for example, be used by a bank to inter-connect automated banking machines or ATMs via an interbank network to the server 100. Although an interbank network may already comply with a high security standard, the level of security may further be increased by transmitting an encrypted video stream instead of the banking data to a client. In some embodiments, also any input data, such as keyboard input, credit card number, PIN, and other data input, may also be transferred in a secured way to the server 100. In addition to the rendered data stream, the server 100 may transfer further data to the client in a secured way. For example, the actual control of releasing of banknotes in an ATM can be transferred back from the server 100 to the respective client. The rendering of the output on the server 100 allows the bank to display additional information on the screen of said client, such as advertisement, by combining the output of said application and the additional information on the server 100 into one data stream. The additional data can be individually updated as often as necessary, for example, based on the profile or feedback of the customer or information provided by the local branch of the bank. Also, for example, a bank may provide said online banking application 370b executed in environment 360b. All financial data remains separated from the online banking application 370b and are stored in an online database 300b.

In yet another example, a car manufacturer may create a car configuration tool, which is accessed through the server 100, wherein customers can select all possible options to customize a car. Even though the client application is run on slow or even old devices, or devices with limited resources, such as old PC systems, mobile phones, web enabled TVs, or others, the server 100 may deliver the same output of high visual quality everywhere, such as fluently rendered video sequences of the vehicle in real-time. Thus, the same application that is provided at a car dealer's shop can be accessed at home via the Internet. For example, the configuration tool may be installed as the remote access application 370c executed in environment 360c. The online data base 300c may store individual configurations chosen by a customer, as well as three-dimensional representations, such as meshes, textures, and other geometric data of available vehicles and car components, assembled by application 370c, rendered by the renderer 140 of the server 100 and provided to the user.

Also, a company may set-up an online shop application 370d, for example, a web shop, in environment 360d. The billing and other financial transactions related to activities of the online shop application 370d require an increased level of security and may, therefore, be stored in a separate database 300b. Even though, the online shop application 370d may utilize fancy product videos to advertise products along with a highly animated interface and high-resolution textures, the online shop application 370d guarantees the same user experience on any client device, since the output of the online shop application 370d is rendered by the renderer 140 of the server 100 and is therefore independent of any graphics hardware or other resources and restrictions of the client device accessing the online shop application 370d. Since each access to the online shop application 370d and the rendering of the output of the online shop application 370d are handled by the server 100, no financial or billing data or any product data as such need to be downloaded to the client device. Also, since all data remain in the associated database 300d any possibility to gain unauthorized access to the data is greatly reduced. Further to hosting the database 300d directly on the server 100, the database 300d may also be provided on an additional storage system of a web shop owner.

It is to be understood that applications 370a, 370b, 370c, 370d described in connection with the exemplifying embodiment of the present disclosure shown in FIG. 3 are only examples of applications or security-critical applications and that the disclosure is not limited to these applications only. In fact, any application can be hosted by the server 100 in order to increase the security level of remote access. Moreover, the approach described herein provides the highest possible quality of output of each application, which is only limited by the rendering capabilities of the server 100, wherein the resulting output is displayed on each client device in the same way.

The renderer 140 and interface 150 of the server 100 may be capable of establishing a separate connection to a plurality of clients in order to grant access to one or more of said applications 370a, 370b, 370c, 370d. As an alternative, for each client, a separate renderer and interface can be instantiated such that the server 100 provides a separate renderer and interface for each client. Also, each separate renderer and interface may be connected through separate connections to all applications 370a, 370b, 370c, 370d provided at the server 100. Alternatively, each separate connection may be established upon request and only if the client is granted access to the requested application 370a, 370b, 370c, 370d after a successful authentication.

Figure 4A:
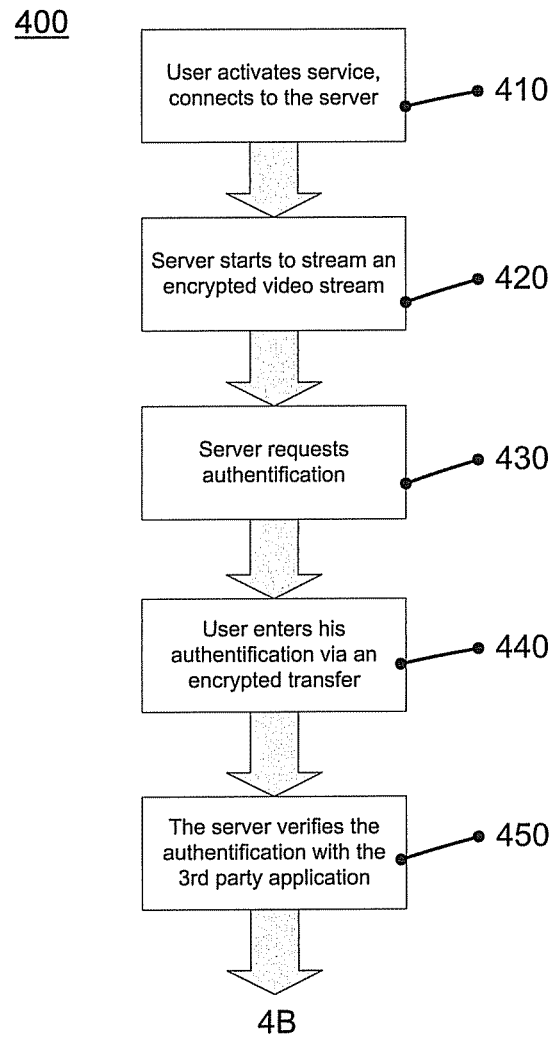
FIGS. 4A and 4B illustrate a flow diagram of a method for providing access to applications according to an embodiment of the present disclosure.
Figure 4B:
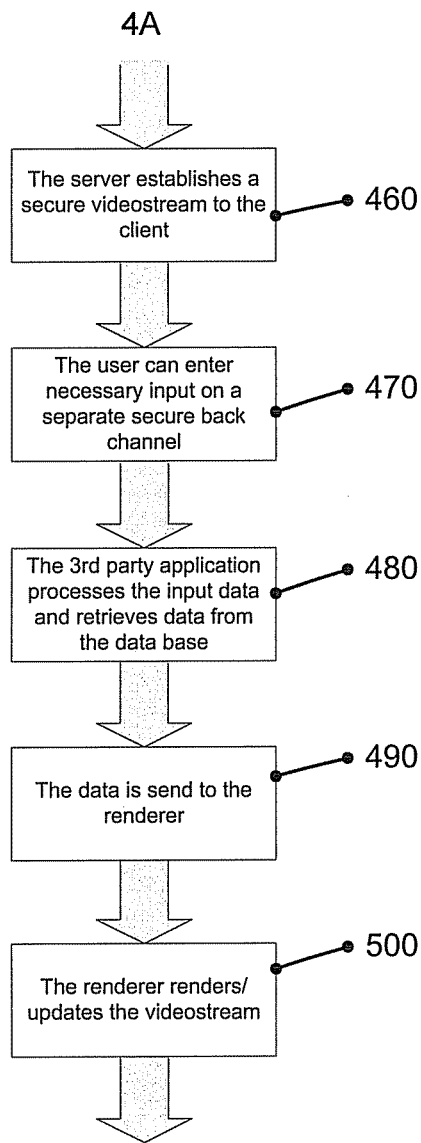

FIGS. 4A and 4B show a flow chart of a method 400 for granting access to applications according to an embodiment of the present disclosure. In some embodiments, the method 400 may comprise activating a service by a user and connecting to a server 410. After successful connection, the server may start streaming an encrypted video stream 420 and request authentication of the user 430. The user may enter his authentication via an encrypted transfer 440, which may be transferred from the client to the server via an encrypted input channel. The server may verify the authentication data with an application requested by the user 450. If the authentication is successful, the server may establish a data stream to the client 460, such as a video and/or an audio stream secured through an encrypted output channel, in order to deliver a rendered output of the application to the user's device. The user may interact with the rendered output by entering input data, which is transferred to the server on a separate secured back channel 470, such as the encrypted input channel. The application receives the input data through the server and handles the input data as a direct local input 480. As a consequence, the application may access application data, which may be, for example, retrieved from a database. The output of the application can be sent to the renderer 490, which renders or updates the output data stream as required 500. The updated data stream is in some embodiments provided to the client via the encrypted output channel and the user may continue to interact with the application and enter further input data 470. The user may also exit the connection to the server and the application.

Even though the approach herein has been described with regard to exemplifying embodiments, various modifications may be carried out on the described example method or server without leaving the scope of the disclosure. For example, different rendering techniques, encryption techniques, databases, networks to connect the server with the client, connections and links within the server and environment, as well as server and client components may be used to implement the present disclosure. Also, the disclosure is not restricted to any particular network standard, communication protocol, and type of a network, and is not restricted to any particular codec or bitstream such as an audio or video codec. Furthermore, the disclosure may be practiced within the scope of the claims differently from the examples described. In particular, features of the examples may be combined, omitted, or added in any suitable way, and may be of importance for the disclosure in any combination.

The embodiments of the disclosure in which an exclusive property or privilege is claimed are defined as follows:

1. A server for providing access to applications, comprising:
   an input channel and an output channel to connect a client with said server;
   an interface coupled to said input channel and an application, said application being executed in an environment, said interface configured to receive input data from said client via said input channel and to communicate said received input data to the application via a secured connection; and
   a cloud renderer coupled to said output channel and said application, said cloud renderer configured to receive output of said application via the secured connection, to continuously render the output of said application and feed the results into a data stream transferred via the output channel to the client, said rendered data stream to be displayed on the client, wherein the input data and the data stream are both encrypted.

2. The server according to claim 1, further comprising a management component for setting-up the environment and managing the application in said environment.

3. The server according to claim 1, wherein said environment further comprises a database coupled to said application via a further secured connection within the environment.

4. The server according to claim 1, wherein the interface and the renderer are coupled to one or more additional applications executed in one or more additional environments.

5. The server according to claim 1, wherein the data stream includes an audio stream and a video stream, wherein the audio stream is compressed using an audio codec, the video stream is compressed using a video codec, and the encoded audio and video streams are assembled in a container bitstream.

6. The server according to claim 1, wherein the input data comprises one or more of a key stroke, mouse data, touch data, photographic information, finger scan, credit card scan, and ID-scan.

7. The server according to claim 1, wherein the interface is further configured to authenticate said client, including receiving authentication data from the client via an encrypted transfer and verifying the authentication data with said application.

8. The server according to claim 7, wherein the data stream is encrypted based on the authentication of the client using a public-key algorithm or a symmetric-key algorithm and the input data is encrypted using a public-key algorithm or a symmetric-key algorithm.

9. The server according to claim 1, wherein the client connects to the server through a small-client application or an application embedded in a web page.

10. A method for providing access to applications, comprising:
    connecting a client with a server via an input channel and an output channel;
    executing an application in an environment;
    receiving, by an interface of the server, input data from said client via said input channel;
    communicating, by an interface of the server, said received input data to the application via a secured connection;
    receiving, by a cloud renderer of the server, output of said application via the secured connection;
    continuously rendering, by the cloud renderer of the server, the output of said application and feeding the results into a data stream; and
    transferring said data stream via the output channel to the client, said rendered data stream to be displayed on the client, wherein the input data and the data stream are both encrypted.

11. The method according to claim 10, further comprising setting-up the environment and managing the application in said environment through a management component of the server.

12. The method according to claim 10, further comprising said application accessing a database in said environment via a further secured connection within the environment.

13. The method according to claim 10, further comprising providing one or more additional applications executing in one or more additional environments.

14. The method according to claim 10, further comprising transferring additional encrypted data to the client via the output channel.

15. The method according to claim 10, wherein said rendering comprises:
   rendering an audio stream and a video stream into said data stream;
   encoding the audio stream using an audio codec;
   encoding the video stream using a video codec; and
   assembling the encoded audio and video streams in a container bitstream.

16. The method according to claim 10, further comprising authenticating said client, including receiving authentication data from the client via an encrypted transfer and verifying the authentication data with said application.

17. The method according to claim 16, further comprising encrypting the data stream based on the authentication of the client using a public-key algorithm or a symmetric-key algorithm, and encrypting the input data using a public-key algorithm or a symmetric-key algorithm.

18. The method according to claim 10, wherein the client connects to the server through a small-client application or an application embedded in a web page.

* * * * *